(No Model.) 2 Sheets—Sheet 1.
L. BECKER.
MEANS FOR DISCONNECTING CHAINS, BUCKLES, STRAPS, &c.
No. 513,607. Patented Jan. 30, 1894.
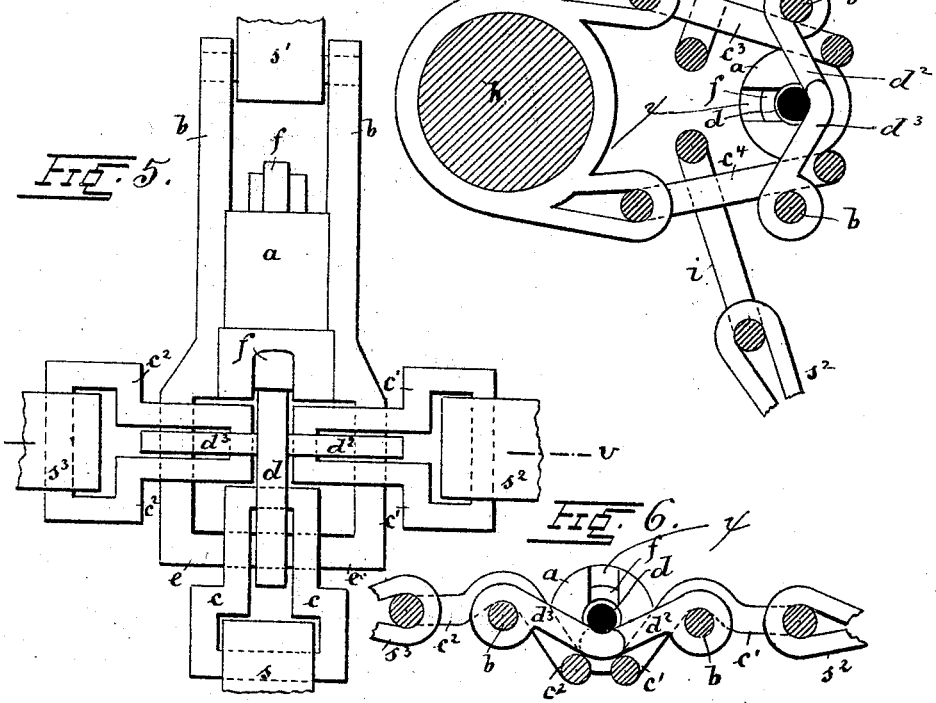

(No Model.) 2 Sheets—Sheet 2.
L. BECKER.
MEANS FOR DISCONNECTING CHAINS, BUCKLES, STRAPS, &c.
No. 513,607. Patented Jan. 30, 1894.
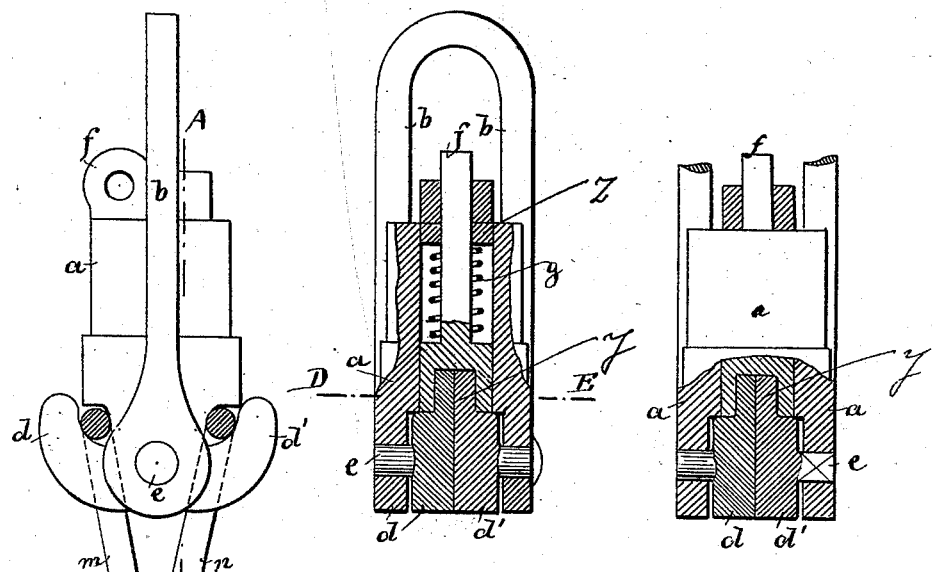
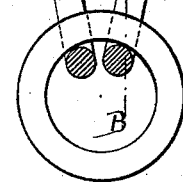
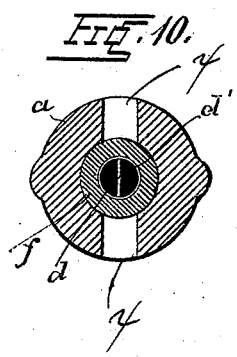
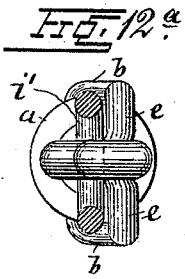
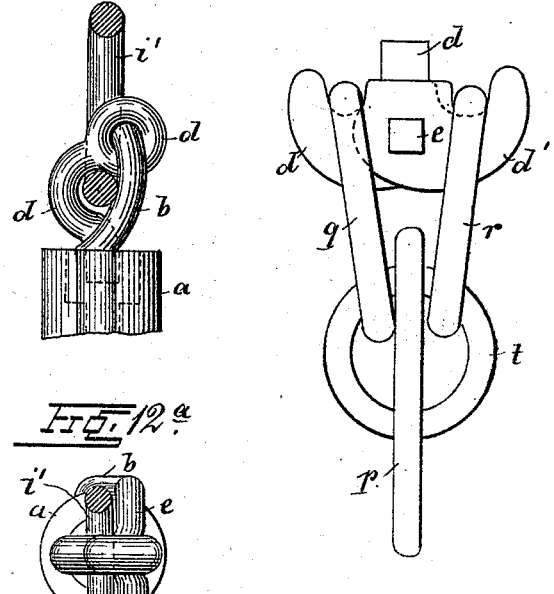
Witnesses:
1) S. Brashears
2) A. B. Digger
Inventor: Ludwig Becker
per G. Dittman
Attorney
THE NATIONAL LITHOGRAPHING COMPANY,
WASHINGTON, D. C.

UNITED STATES PATENT OFFICE.

LUDWIG BECKER, OF FRANKFORT-ON-THE-MAIN, GERMANY.

MEANS FOR DISCONNECTING CHAINS, BUCKLES, STRAPS, &c.

SPECIFICATION forming part of Letters Patent No. 513,607, dated January 30, 1894.

Application filed October 27, 1892. Serial No. 450,092. (No model.)

*To all whom it may concern:*

Be it known that I, LUDWIG BECKER, of Frankfort-on-the-Main, in the Kingdom of Prussia, Germany, have invented certain new and useful Improvements in Means for Disconnecting Chains, Buckles, Straps, &c., from their Joints, Buckles, or Fastenings, of which the following is a full, clear, and exact description, reference being had to the accompanying drawings, in which—

Figure 1 is a front view of my improved device with a link attached thereto. Fig. 2 is a side view of the same. Fig. 3 is a front view of the same with parts broken away and the link removed. Fig. 4 is a cross-section on the line $k$—$z$ of Fig. 1. Fig. 5 is a front view of a modified form of my improved fastening device. Figs. 6 and 7 are end views of other forms embodying my invention. Fig. 8 is a side view of still another form with links attached thereto. Fig. 9 is a front view of the same links removed and parts broken away. Fig. 10 is a cross-section on the line D—E, Fig. 9. Fig. 11 is a detail of still another form. Fig. 11$^a$ is a detail of the locking means and relates to the device shown in Fig. 11. Fig. 12 is a side view of another modification. Fig. 12$^a$ is an end view of the same.

My invention relates to improved means for readily and easily disconnecting chains, straps, ropes, and the like, from their joints, buckles, hoops, rings or other fastenings, or connecting devices.

My invention is particularly applicable to harness-straps, chains or ropes for horses or draft-cattle whereby, when desired, the fastenings can be disconnected with the least possible delay; and said invention consists in the combination and arrangement of parts hereinafter described and claimed.

In the drawings $b$ represents a suitable frame for my improved locking device in which is supported a casing $a$ preferably of cylindrical form with a notch $x$ cut through said casing at one or more points in one end thereof. In this casing $a$, is adapted to operate a latch $f$ whose apertured end $y$ is normally held down against the bottom of the casing $a$ by a coiled spring $g$. This spring $g$ is confined within the casing at the upper end by means of a suitable cover $z$ through which the upper end of the latch $f$ is adapted to protrude, the said upper end of the latch being provided with means as shown at $f'$ for attaching a connection for operating the latch. To a portion of the framing $b$ (preferably as indicated at $e$) is pivoted a fastening prong $d$ whose outer end is adapted to be passed through the notch $x$ into the casing $a$ and in line with the aperture in the latch $f$. This fastening prong $d$ which I have just described may be constructed so as to support or connect with any of the several different kinds of links indicated at $c$, $m$ and $i'$ in the drawings or any suitable link or connection, either by a portion of the link passing around the prong as indicated in Fig. 1 or by means of hooks or other attachments united thereto as indicated in Figs. 8 and 11, and any suitable number of such links may be controlled by the fastening prong $d$, there being three $c$, $c'$ and $c^2$ shown so controlled in Fig. 5, the prongs $d^2$ $d^3$ in said figure being supported against and adapted to be released by the fastening prong $d$. The connections to which the various links are united, as indicated at $i$, Fig. 7 $s$, $s^2$, $s^3$ Figs. 5, 6 and 7, $m$ $n$ Fig. 8, $q$ $r$, $t$ $p$ Fig. 11 and $i'$ Fig. 12 are merely shown to better illustrate the applicability of the fastening means forming the subject-matter of this invention.

In the construction shown in Fig. 8 the pivoted hooks $d$ $d'$ have attached prongs or shanks which are held and released in the same manner as the fastening prong shown in Fig. 1, while in the construction shown in Fig. 11 only one of the hooks can be released, the other being held from movement by the square lug $e'$ located in the same relative position as the pivot $e$ of the other hook and adapted to be locked in a suitable aperture.

When it is desired to unite the parts in the construction shown in Figs. 1, 2, 3, and 4 it is merely necessary to draw back the latch $f$ far enough to allow the prong which has already engaged the link to pass through the notch $x$ in the casing and when said prong comes in line with the aperture in the latch, the latter is released and springs in its normal position as shown in Fig. 3 securing the prong against lateral movement. The constructions shown in the various figures of the drawings all operate in a like manner, the differences being merely in the manner of supporting the various links.

Having thus described my invention, what I claim, and desire to secure by Letters Patent, is—

1. The combination of a casing, a support therefor, a notch therein, a prong for locking a link or connection, a free end of said prong being adapted to pass through said notch and into the casing and a latch with an aperture therein adapted to contain the said free end of the prong, substantially as described.

2. The combination of a casing, a support therefor, a notch therein, a pivoted prong with means connected thereto for supporting suitable links or connections, a free end of said pivoted prong being adapted to pass through said notch and into the casing, and a latch with an aperture therein adapted to contain the said free end of the prong, whereby when the latch is withdrawn the parts may be disconnected, substantially as and for the purposes specified.

In witness whereof I hereunto set my hand in presence of two witnesses.

LUDWIG BECKER.

Witnesses:
ALVESTO S. HOGUE,
JEAN GRUND.